INVENTORS
HARRY G. ANASTASIA
EDWARD J. HAZEN
BY

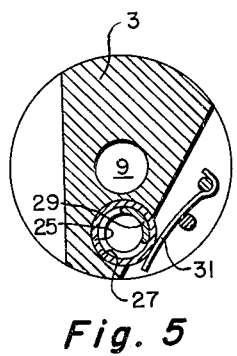
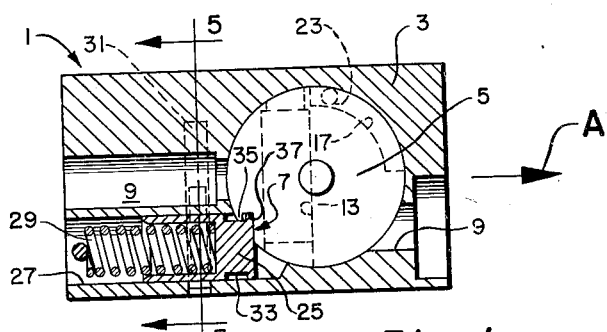
Fig. 5     Fig. 1
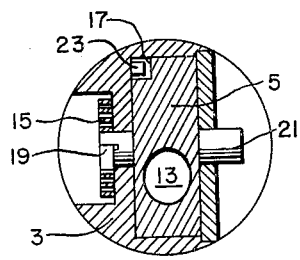
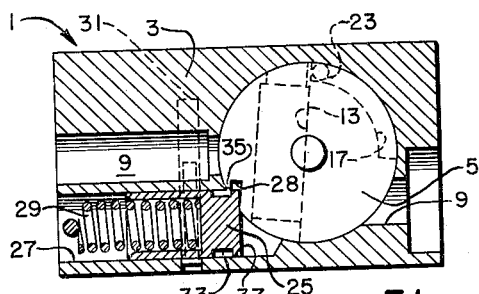
Fig. 4     Fig. 2
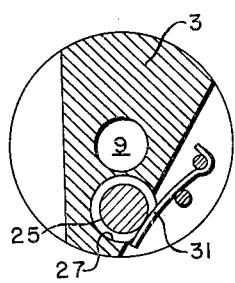
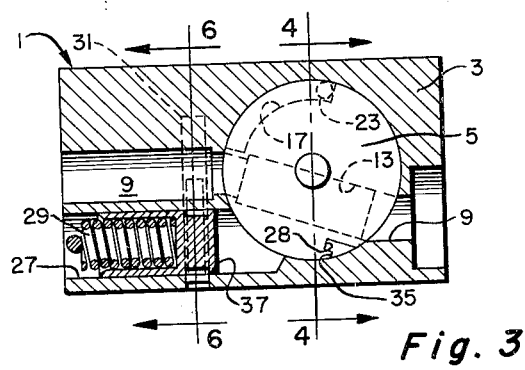
Fig. 6     Fig. 3
INVENTORS
HARRY G. ANASTASIA
EDWARD J. HAZEN Sept. 19, 1961  H. G. ANASTASIA ET AL  3,000,315
SAFETY AND ARMING MECHANISM Filed July 23, 1958  4 Sheets-Sheet 2

Sept. 19, 1961  H. G. ANASTASIA ET AL  3,000,315
SAFETY AND ARMING MECHANISM
Filed July 23, 1958  4 Sheets-Sheet 3

INVENTORS
HARRY G. ANASTASIA
EDWARD J. HAZEN
BY
W. E. Thibodeau, A. J. Dupont & A. E. Arnold, Jr.

Sept. 19, 1961  H. G. ANASTASIA ET AL  3,000,315
SAFETY AND ARMING MECHANISM
Filed July 23, 1958 4 Sheets-Sheet 4
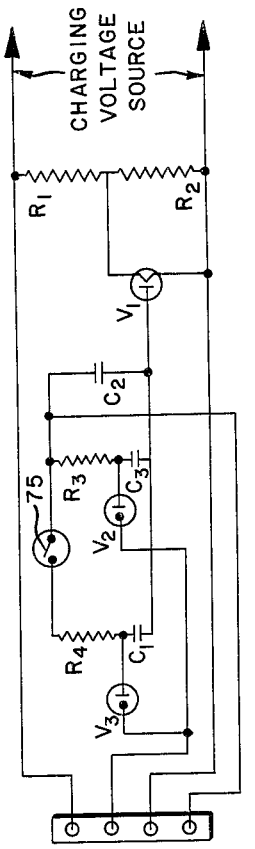
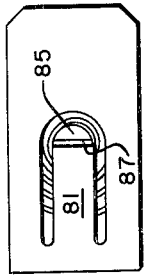
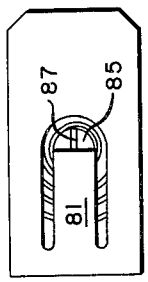
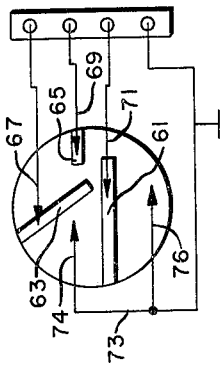
INVENTORS
HARRY G. ANASTASIA
EDWARD J. HAZEN
BY
W. E. Thibodeau, A. J. Dupont & A. E. Arnold, Jr.

United States Patent Office 3,000,315
Patented Sept. 19, 1961

3,000,315
SAFETY AND ARMING MECHANISM
Harry G. Anastasia, Paramus, and Edward J. Hazen, Westwood, N.J., assignors to the United States of America as represented by the Secretary of the Army
Filed July 23, 1958, Ser. No. 750,545
6 Claims. (Cl. 102—70.2)

The present invention relates to fuzes for ordnance and more particularly to a safety and arming device of the type useful to interrupt the powder train of such fuzes.

In general, ordnance fuzes of the type to which the present invention is directed are those wherein an explosion discharge passage of a powder train remains blocked until the projectile with which it is associated has traveled a reasonably safe distance from the gun from which it is discharged or, at least, until the projectile has started its flight. Prior art devices have made use of various arrangements, some of which, like that disclosed in the U.S. Patent to G. Rove et al., Number 2,789,508, utilize one or more clockwork arrangements to effect a time delay, or, others which are intricate mechanisms requiring manual operations prior to launching. Prior art apparatus of such kind is usually complicated, costly to produce, and requires relatively great space requirements.

Therefore, it is a primary object of the present invention to provide an improved safety and arming mechanism for ordnance fuzes which is self-contained and requires no manual operations prior to launching.

It is also a primary object of the present invention to provide a safety and arming device which is of relatively simple construction and requires a minimum of space.

Another object of the present invention is to provide a safety and arming device which will guard against arming of the fuze until the projectile is subjected to a sustained acceleration force.

A further object of the present invention is to provide an arrangement which is self-energized and requires no external setting.

Still another object of the present invention is to provide an improved safety and arming mechanism which is operated by linear acceleration forces and is independent of projectile spin rates.

Still further it is an object of the present invention to provide an arrangement which is applicable to mechanical as well as electrically responsive types of fuzes.

Also it is an object of the present invention to provide an improved switching arrangement for a safety and arming mechanism utilizing an electrical discharge circuit to discharge the primer.

Additionally it is an object of the present invention to provide a safety and arming device which may be simply and easily regulated to operate over a wide range of acceleration and which is highly efficient in use.

In accordance with the present invention, the safety and arming device for an ordnance fuze having an explosive train comprises a rotor having an ignition conducting passage mounted for rotation between an unarmed position and an armed position angularly related thereto. In the unarmed position, portions of the rotor are disposed to interrupt the explosive train of the fuze and, in the armed position, the ignition conducting passage is disposed in continuity with the explosive train. The rotor is normally held locked against movement from the unarmed position by a locking pin or piston. Upon sustained acceleration of the fuze, the locking pin is retracted by force of setback thereby releasing the rotor for movement to the armed position. Means are provided for preventing accidental displacement of the locking pin incident to sudden jar or impact thereby precluding premature arming. In case a primer is used which is responsive to an electrical charge, the mechanism is arranged so that the rotor functions as a switch. In the unarmed position, the primer is short circuited and the electrical components of the circuit are connected to receive a fuze-charging voltage. In the armed position, the components are no longer connected to receive the fuze-charging voltage and the primer is no longer short circuited but is connected in circuit ready to receive the discharge incident to firing. Additionally, a modification of the means for preventing premature arming utilizes a rotor having an unbalanced mass responsive to setback force to effect initial movement of the rotor in a manner to free the lockpin for retraction as a result of sustained acceleration.

The novel features of the present invention, as well as additional objects and advantages thereof, will be understood better from the following detailed description when read in connection with the accompanying drawings in which:

FIGURE 1 is a central sectional view of a first embodiment of safety and arming device in accordance with the present invention showing the parts in their initial unarmed position;

FIGURE 2 is a view similar to FIGURE 1 showing the same parts after movement of the rotor to a position in the process of unlocking the device;

FIGURE 3 is a view similar to FIGURE 1 showing the same parts after movement to the final armed position;

FIGURE 4 is a sectional view, taken along the line 4—4 of FIGURE 3;

FIGURE 5 is a sectional view, taken along the line 5—5 of FIGURE 1, showing the position of the locking pin in the initial unarmed position of the apparatus;

FIGURE 6 is a sectional view, taken along the line 6—6 of FIGURE 3, showing the position of the locking pin in the armed position of the apparatus;

FIGURE 14 is an end view of the parts shown in FIGURE 13 and disposed in unlocked position;

FIGURE 15 is a view similar to FIGURE 14, the parts being shown in locked position;

FIGURE 16 is a wiring diagram of an electrical discharge system useful with the present invention and shown associated with the rotor switch elements disposed in the unarmed position; and FIGURE 17 is a view of the rotor switch elements shown in FIGURE 16 with the parts shown disposed in the armed position.

Referring more particularly to the drawings, wherein similar reference characters are used to designate corresponding parts throughout, two embodiments of the present invention are shown.

Figure 7:
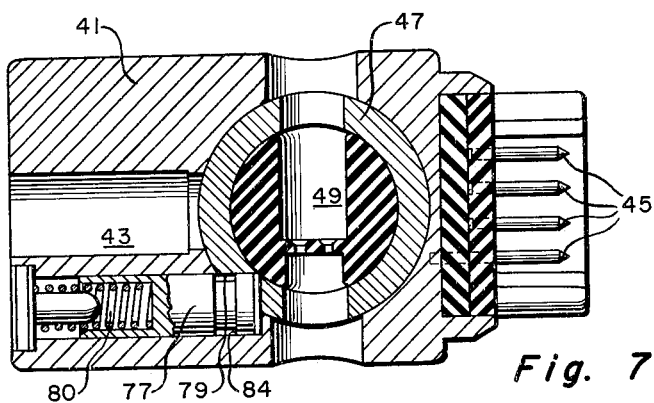
FIGURE 7 is a central sectional view of a second embodiment of the present invention showing the parts in their initial unarmed position.
Figure 8:
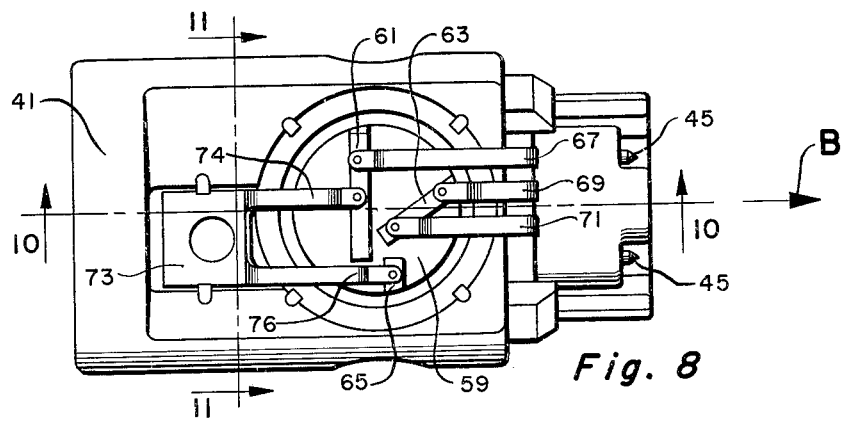
FIGURE 8 is an elevation view of the device shown in FIGURE 7, the parts being shown in the initial unarmed position.
Figure 10:
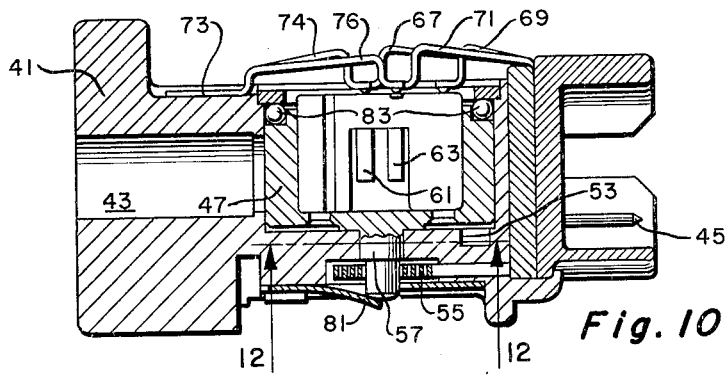
FIGURE 10 is a sectional view, taken along the line 10—10 of FIGURE 8, the locking spring and rotor shaft being shown in unlocked position.

The first embodiment, which is illustrated in FIGURES 1 through 6 of the drawings, comprises a mechanical arrangement of a safety and arming device 1 useful as part of an ordnance fuze (not shown). Such fuzes usually have an explosive train in which a safety device is employed to prevent premature arming of the fuze until after the projectile or missile it is associated with has traveled a reasonably safe distance from the gun discharging it.

The arrangement of the present safety device 1 comprises, generally, a frame, suitable housing or support 3, a rotor 5, and locking means 7. The frame is made from any suitable material and is provided with an ignition conducting passage 9 extending therethrough. The orientation of the passage is selected for alignment with one or more other passages (not shown) in the explosive train so that it can transmit an initial firing impulse through successive steps until it reaches the explosive or bursting charge.

In order to interrupt the continuity of the passage as a safety measure, the frame is provided with a rotor 5 which is mounted for rotation about an axis extending normal to the direction (arrow A in FIGURE 1) of acceleration applied to the projectile with which it is associated. The rotor is disposed in the path of the ignition conducting passage 9 of the frame and is itself provided with an ignition conducting passage 13. The rotor passage is located in such a position that, in the normal unarmed position of the fuze (FIGURE 1), a solid portion of the rotor body interrupts the ignition conducting passage 9 of the frame and, in the armed position of the fuze (FIGURE 3), the ignition conducting passage 13 of the rotor is aligned with the frame passage.

Movement of the rotor about its axis to relocate the passage from the unarmed position to the armed position angularly related thereto is effected by a coil spring 15 under tension. The coil spring has one end 19 thereof attached to the axle or hub 21 of the rotor about which it is wound and the opposite end (not shown) thereof is appropriately attached to the frame or housing. The spring is so wound and tensioned that it will influence the rotor to move in a counterclockwise direction from the unarmed position shown in FIGURE 1 to the armed position shown in FIGURE 3 of the drawings. As a means of limiting rotation of the rotor in either direction, a stop 23, in the form of a pin, is disposed on the frame and located to extend within a groove 17 provided in the body of the rotor. When the pin engages the rotor wall at either end of the groove movement of the rotor is arrested in the direction of movement.

As a safety measure to prevent premature arming of the fuze, there is provided a locking means in the form of a lock pin 25. The lock pin is mounted for slidable movement within a bore or recess 27 provided in the frame and is disposed for movement parallel to the direction of acceleration of the fuze. The lock pin has an end portion thereof normally biased into a recess 28 provided in the periphery of the rotor by a compression spring 29. The compression spring is located within the hollow interior of the lock pin at the end thereof remote from the rotor and extends beyond the open end of the lock pin being secured to the frame by any suitable means. The parameters of the spring are selected to normally hold the lock pin engaged with the periphery of the rotor but, upon sustained acceleration of the fuze, to allow the lock pin to compress the spring and be withdrawn from engagement with the rotor to the position shown in FIGURE 3 of the drawings. A spring detent 31 is provided on the frame which is tensioned toward the lock pin so that it will spring into an annular groove 33 disposed in the outer surface of the closed end of the lock pin in the withdrawn position, as shown in FIGURE 6 of the drawings. Thus, the lock pin will be prevented from being forced back into engagement with the rotor and the rotor will be free to rotate under influence of the coil spring 15.

In order to prevent accidental disengagement of the lock pin 25 from the rotor sufficiently to release the rotor for movement to the armed position, as in the case of a sudden shock imparted by dropping the fuze or projectile, two proposals are suggested. According to one arrangement, the rotor is grooved to provide a flange 35 on the outer cylindrical surface thereof and the rotor is cut away to provide an unbalanced mass. In the normally safe or unarmed position, as shown in FIGURE 1, the peripheral flange 37 defining the annular groove 33 of the lock pin is engaged with the flange 35 of the rotor. Thus, the lock pin is prevented from movement axially until such time as sustained setback forces influence the unbalanced mass of the rotor sufficiently to rotate it clockwise to the unlocked position shown in FIGURE 2 of the drawings. The second arrangement contemplates a close fit of the lock pin within the bore 27 of the frame so that it will function like a piston with the consequent retarded effect produced by a dash pot effect. However, this last mentioned arrangement will not necessitate the mass of the rotor to be unbalanced so that only in the event of sustained acceleration will the lock pin be withdrawn sufficiently to release the rotor for rotation under influence of the coil spring.

In accordance with the above arrangement, the mechanical version of the present invention, utilizing the first arrangement for preventing premature arming, will be found to operate as follows. From the safe or unarmed position, as shown in FIGURE 1, after the projectile is fired, acceleration forces act upon the unbalanced rotor to move it clockwise to the position shown in FIGURE 2, the limit of travel being controlled by the pin 23. At the same time, the lock pin flange 37 is released from engagement with the rotor flange 35 permitting sustained acceleration forces to move the lock pin 25 to the position shown in FIGURE 3 of the drawings in which position the spring detent 31 will enter the lock pin groove 33 and hold the lock pin withdrawn from the rotor. Upon deceleration of the projectile, the force exerted by the coil spring 15 on the rotor takes effect to reverse movement of the rotor in a counterclockwise direction to the armed position shown in FIGURE 3, where it is stopped by the pin 23. In the armed position, the continuity of the explosive train is completed and the fuze is then armed and ready to receive the firing impulse.

The safety and arming device of the present invention is also applicable to a second embodiment utilizing an electrical detonator, as illustrated in FIGURES 7 through 17 of the drawings. This embodiment operates and functions similarly to the mechanical arrangement described above by interrupting the explosive train with the aid of a rotor member which also serves as a switch for the electrical circuits necessary to ignite an electrical detonator through an electrical discharge.

In this embodiment, the body or frame 41 of the safety and arming mechanism is provided with an ignition conducting passage 43 at one end thereof and a plurality of contact pins 45 are disposed in the other end in a manner to serve as a plug for connection with a suitable electrical discharge circuit. The rotor 47 of this embodiment is centrally located in the frame and is provided with a chamber or passage 49 for receiving an electrically responsive detonator or squib (not shown). The rotor is mounted for rotation between a normal unarmed position and an armed position angularly related thereto. The rotor is so disposed that, in the unarmed position, a portion of the rotor body is disposed between the frame passage 43 and the squib chamber 49 and, in the armed position, the squib chamber is aligned with the frame passage. A suitable stop 51 is provided on the rotor which cooperates with an arcuate groove 53 in the frame the function of which is to limit rotation of the rotor in either direction.

Like the rotor 11 of the above described embodiment, the rotor 47 has a coil spring 55 attached to the hub or axle 57 the function of which is to constantly bias the rotor for movement to the armed position. On the face 59 of the rotor opposite that on which the coil spring is disposed, a plurality of electrical contact strips or members 61, 63, 65 are embedded or attached by suitable means. Appropriately, the rotor body should be made from a material having electrical insulating characteristics. As a further means of connecting the rotor contacts with a discharge circuit, the body or frame 41 is provided with a plurality of electrical contact members 67, 69, 71, 73 which are embedded or otherwise suitably attached thereto.

The terminal portions of the body contact members which are intended for contact with the rotor contact members are disposed to provide springlike fingers which are biased into contact with the rotor and the contact members carried thereby. The opposite ends of the body contact members are supported by a suitable insulator and terminate in pins 45 arranged for plugging into a socket connected with the discharge circuit.

One form of discharge circuit which may be utilized with this device is a conventional RC circuit, that is, a circuit employing a combination of resistors and capacitors for storing up electrical energy for discharge by a diode tube. A typical circuit is represented in FIGURE 16 of the drawings.

In accordance with this circuit, an instantaneous charge is applied across resistors $R_1$ and $R_2$ which are in series. This charge is a pulsed-voltage which is conducted through a diode tube $V_1$ to build up a static charge across condenser $C_2$. The contact members are so arranged that, in the unarmed position, the switching effect of the rotor connects contact members 67 and 73 through rotor contact 61 thereby conducting the fuze-charging voltage to condenser $C_2$. In the armed position of the rotor, contacts 67 and 73 are no longer connected and, as a result, the charge on condenser $C_2$ bleeds off into condenser $C_3$ through resistor $R_3$ to equalize the potential in the closed circuit. When the static charge across condenser $C_3$ reaches a predetermined voltage, it will arc across discharge tube $V_2$ and ignite the primer by conducting the discharge through contact members 69 and 71, thence through rotor contacts 61, 65 connected with the primer.

The circuit additionally contemplates discharge upon contact of the missile with a foreign object. The is accomplished by connecting an impact switch 75 between resistors $R_3$ and $R_4$ which functions by closing when the missile strikes the foreign object. Closing of the impact switch allows condenser $C_3$ to arc across discharge tube $V_3$ and ignite the primer by conducting the discharge through the contact members 69 and 71 as described above with respect to tube $V_2$.

In addition to functioning as a switch for the discharge circuit, the rotor and body contacts are arranged to provide a shunt connection for the electrodes of the primer as long as the safety and arming mechanism is in the normal unarmed position. This arrangement is observed particularly in FIGURE 8 of the drawings wherein the contacts 61, 65 connected with the primer are shunted by contact 73 of the body which, in the present embodiment, is bifurcated at one end to provide a pair of spring fingers or contact members 74, 76, for engaging, respectively or rotor contacts 61, 65. Thus, by means of this safety feature, it will be recognized that if the timing circuit is charged but the missile booster misfires, i.e., the missile does not leave the launcher, the missile is safe even though the fuze may be subjected to further pulsed charges or other factors which may cause the impact switch to close. Not only will the primer be short circuited but also condensers $C_1$ and $C_3$ will discharge through $V_3$ and $V_2$, respectively, causing no damage to the fuze or leave a dangerous electrical potential at a time of disarming.

Figure 9:
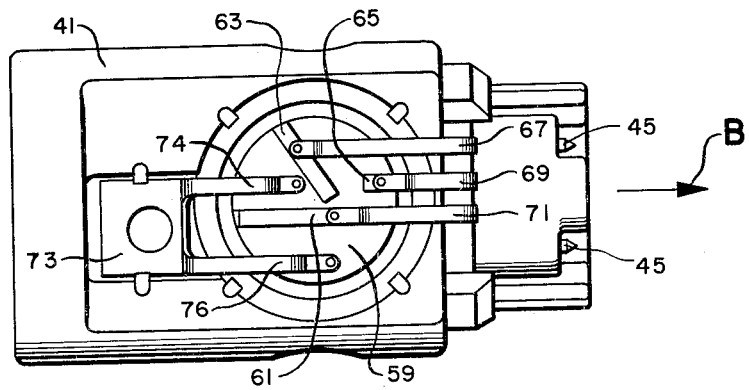
FIGURE 9 is a view similar to FIGURE 8, showing the same parts in the final armed position.
Figure 11:
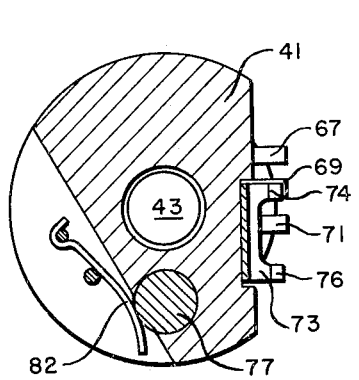
FIGURE 11 is a sectional view, taken along the line 11—11 of FIGURE 8.
Figure 12:
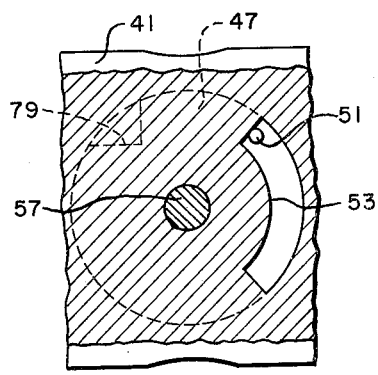
FIGURE 12 is a full sectional view, taken along the line 12—12 of FIGURE 10, showing the stop for the rotor.
Figure 13:
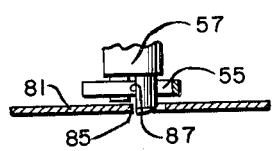
FIGURE 13 is a side view of the locking spring and rotor shaft shown in FIGURE 10, the parts being shown broken away and disposed in locked position.

However, as the rotor is moved to the armed position, it will be observed in FIGURES 9 and 17 that contacts 67 and 73 are no longer connected by contact 61 thereby preventing condenser $C_2$ from becoming charged further and the shunt connection of the primer contacts 69, 71 is eliminated thereby conditioning the primer for receiving the igniting charge from the discharge apparatus.

It will be observed that the arrangement of this embodiment is disclosed as utilizing the dash pot type of lock pin to retain the rotor in the unarmed position. The lock pin 77 of this embodiment is engaged with the rotor and disposed in a recess 79 which is provided in the peripheral surface of the rotor. Like the lock pin 25 in the above described embodiment, the lock pin 77 is biased toward the rotor by a compression spring 80. However, there is no flange provided on the rotor and lock pin to prevent accidental withdrawal as in the embodiment described above and it is not necessary to employ an unbalanced rotor. The retarded action provided by the dash pot arrangement is relied upon solely as a safety device to prevent such accidental withdrawal. On the other hand, in the event of sustained acceleration, in the direction indicated by the arrow B in FIGURE 9, the lock pin will be withdrawn sufficiently to release the rotor. As in the previous described embodiment, a leaf spring 82 is provided on the body which will engage a peripheral recess 84 provided on the lock pin for the purpose of holding the lock pin in the withdrawn position.

Although the coil spring 55 attached to the rotor shaft 57 may ordinarily be relied upon to hold the rotor in its armed position, it is conceivable that extraneous flight accelerations could cause the rotor to move from the armed position against the action of the coil spring. As a further safety measure, a leaf spring 81 is attached to the body 41 which is disposed to rest on the end of the rotor shaft adjacent to the coil spring and exert a thrust force on the rotor toward ball bearings 83 provided on the opposite side of the rotor. The function of this spring is to reduce friction during the arming rotor movement, restrain axial movement of the rotor due to end play, and lock the rotor in the armed position against rotation. The locking feature is accomplished by adjusting the end 85 of the spring to terminate short of the axis of the hub 57 and a segment of the hub is cut away to provide a flat surface 87, as shown particularly in FIGURE 13 of the drawings. As the rotor is moved to the armed position, the spring end 85 will drop into the hub cutaway portion and engage the flat surface 87 locking the shaft and rotor carried thereby against movement.

From the foregoing description it will become obvious to those persons skilled in the art that the present invention provides a relatively simple safety and arming mechanism which is "self-energizing" inasmuch as it requires no external setting or manual operations prior to launching. The arrangement is such that it will respond to linear acceleration forces with negligible, if any interference from centrifugal forces which may develop from the flight of the projectile it is associated with. On the other hand, the safety features embodied particularly in the electrical version result in the apparatus being completely bore safe.

Although there is shown and described but two embodiments of the present invention, it will undoubtedly be apparent to those skilled in the art that other modifications, as well as changes in those described, are possible without departing from the spirit of the invention. For example, the discharge circuit shown and described herein is disclosed for illustrative purposes only and may be substituted with any suitable circuit which will effectively detonate an electrically responsive primer. On the other hand, the components of the safety device may also be rearranged to satisfy design or other requirements.

Accordingly, it is desired that the present invention shall not be limited except insofar as is made necessary by the prior art and by the spirit of the appended claims.

What is claimed is:
1. In an explosive train for a fuzed projectile which is subjected to acceleration forces incident to firing, a safety and arming device comprising a housing, a rotor mounted within said housing for rotation about an axis disposed normal to the trajectory of the projectile, said rotor having an ignition conducting passage disposed for rotation between unarmed and armed positions angularly related to each other, the mass of said rotor being unbalanced about the rotation axis such that forces incident to set back will tend to rotate said rotor in one direction, means biasing said rotor for rotation in a direction opposite to said one direction and being effective to move said rotor from said unarmed position to said armed position, said rotor being recessed to provide a flange in the outer surface thereof, and means for releasably locking said rotor in said unarmed position, said locking means comprising piston means, and means biasing said piston means into engagement with said flange, said piston means being responsive to sustained force of set back of sufficient magnitude to oppose said piston biasing means and being movable incident to rotation of said rotor in said one direction sufficiently to become disengaged from said flange.

2. The invention as defined in claim 1 and wherein said safety and arming device includes a means engageable with said locking means to retain said locking means in a withdrawn position upon movement a predetermined amount.

3. The invention as defined in claim 2 and wherein said safety and arming device includes a means engageable with said rotor means to retain said rotor means against movement only after movement of said rotor means to an armed position.

4. In an explosive train for an electrically operated projectile fuze, an acceleration actuated arming mechanism comprising an electrically responsive detonator, support means having an ignition conducting passage, rotor means supporting said detonator for movement about an axis between a first unarmed position out of communication with said passage and a second armed position in communication with said passage, said rotor means being eccentrically mounted with respect to said axis in such manner as to be responsive to forces of inertia incident to acceleration applied to said fuze tending to move said motor means in a first direction, means biasing said rotor means for movement in a second direction opposite to said first direction and being effective to move said rotor means from said unarmed position to said armed position, electrical conductor means on said support means adapted for connection with a source of electrical energy, electric contact means on said rotor means connected with said detonator, said contact means being disposed for wiping contact with said conductor means in such manner as to provide a shunt connection for said conductor means in said unarmed position of said rotor means and to eliminate said shunt connection and connect said detonator in circuit with the source of electrical energy only in said armed position of said rotor means, and acceleration responsive locking means normally biased into locking engagement with said rotor means, said locking means being responsive to release said rotor means for movement in said second direction upon initial movement of said rotor means in said first direction and withdrawal of said locking means incident to sustained acceleration forces acting upon said locking means.

5. The invention as defined in claim 4 and wherein said arming mechanism includes a means engageable with said locking means to retain said locking means in a withdrawn position upon movement a predetermined amount.

6. The invention as defined in claim 5 and wherein said arming mechanism includes a means engageable with said rotor means to retain said rotor means against movement only after movement of said rotor means to an armed position.

References Cited in the file of this patent

UNITED STATES PATENTS

| 1,311,104 | Watson | July 22, 1919 |
|---|---|---|
| 2,486,362 | O'Brien | Oct. 25, 1949 |
| 2,586,437 | Rabinow | Feb. 19, 1952 |
| 2,625,881 | Rabinow | Jan. 20, 1953 |
| 2,642,801 | Gleason | June 23, 1953 |
| 2,709,962 | Funk | June 7, 1955 |
| 2,712,284 | Thomas | July 5, 1955 |
| 2,748,704 | Dinsmoor | June 5, 1956 |
| 2,789,508 | Rove | Apr. 23, 1957 |
| 2,791,963 | Schuler | May 14, 1957 |
| 2,872,868 | Donahue | Feb. 10, 1959 |

FOREIGN PATENTS

| 714,540 | Great Britain | Sept. 1, 1954 |